J. W. BARTLETT.
Potato-Digger.
No. 62,246.
Patented Feb. 19, 1867.
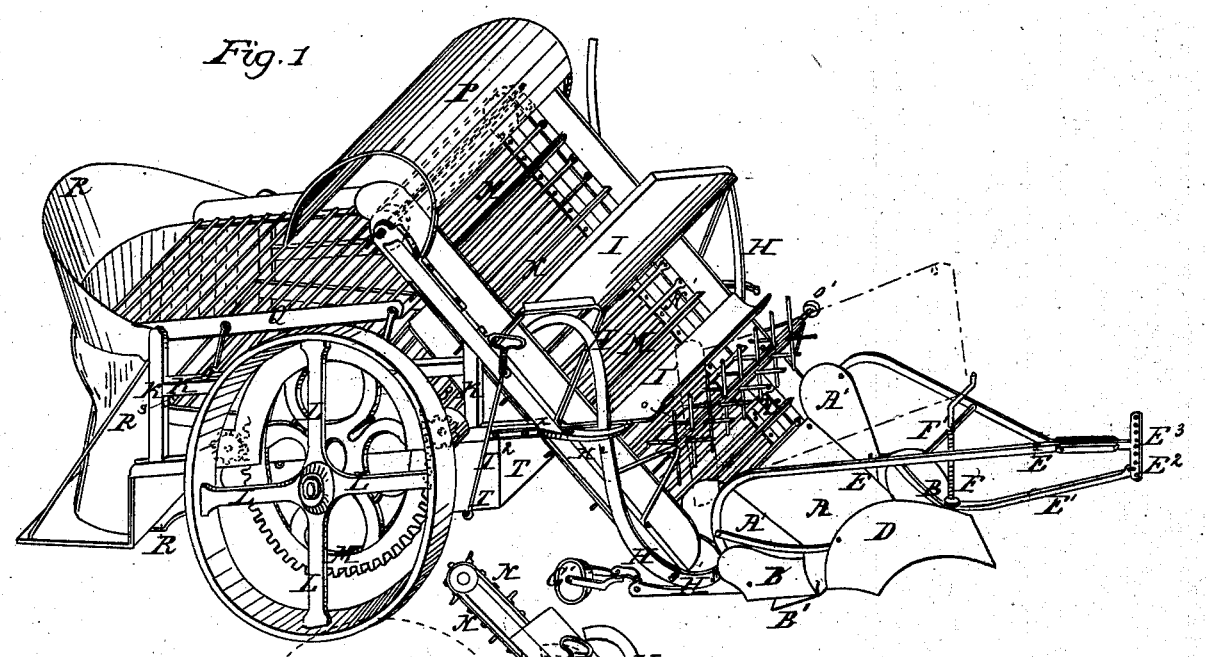
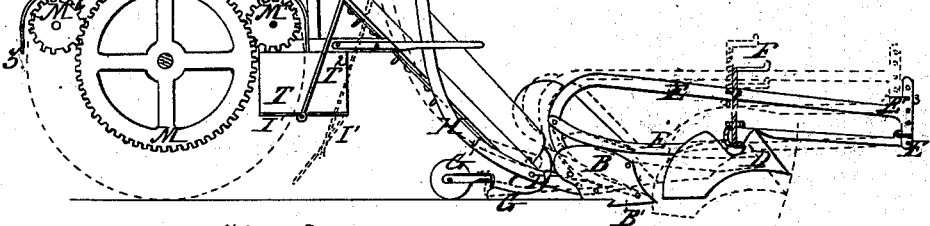
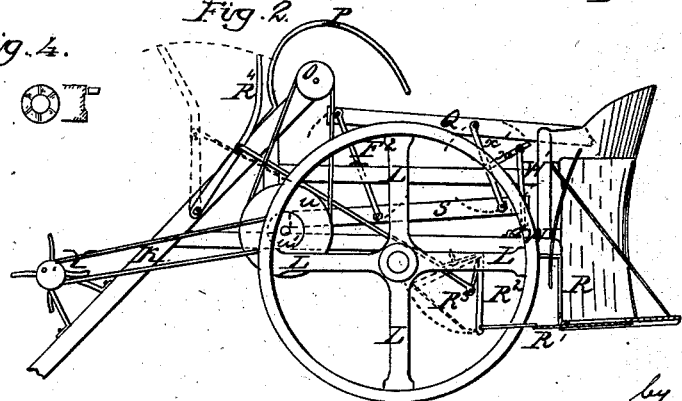

United States Patent Office.

JOHN W. BARTLETT, OF HARMAR, OHIO.

Letters Patent No. 62,246, dated February 19, 1867; antedated February 9, 1867.

---

IMPROVEMENT IN MACHINE FOR DIGGING POTATOES.

---

The Schedule referred to in these Letters Patent and making part of the same.

---

TO ALL WHOM IT MAY CONCERN:

Be it known that I, JOHN W. BARTLETT, of Harmar, in the county of Washington, and State of Ohio, have invented a new and useful Improvement in Machines for Digging Potatoes; and I do hereby declare that the following is a full, clear, and exact description of the construction and operation of the same, reference being had to the annexed drawings, made part of this specification, in which—

Figure 1 is a perspective view.

Figure 2 is a side elevation; and

Figure 3 is a vertical longitudinal section.

The same letters in the different figures indicate identical parts.

To enable others skilled in the art to manufacture my machine, I will describe its construction and operation.

This invention relates to improvements on my machine, as described in Letters Patent No. 47,916, granted May 30, 1865.

A is a shovel plough, the front of which is sharp and straight upon the edge; it is so inclined as to dig into the ground below the bulbs to be gathered. The sides A' extend back to a point within the frame to be hereafter described. B B are mould-boards attached to the exterior of the sides A', and are so flared outwardly as to clear away the earth on each side of the shovel beyond the working parts of the machine. A horizontal flange, B', sharpened upon its edge, extends from the bottom of the mould-board, and cuts the earth, and roots, &c., so as to prevent their obstructing the progress of the machine. The draught is applied to the braces E E, which are secured to the sides A', and, converging, are united at their forward extremities. Other braces, $E^1 E^1$, are attached to the braces E by bolts upon which they may turn vertically, and are attached after being brought together by a link, $E^2$, to the clevis $E^3$. To the braces $E^1$ are attached the track-clearer D. This is formed with two mould-boards, sharp in front and curved outwards below, having the lower edge also sharpened. This track-clearer is adjustable vertically by the screw F, which, passing through the tie F', is fastened to the point of the track-clearer. The object of this device is to clear the ground in front of the shovel of grass, weeds, &c., by the action of the knives, which are so adjusted as to run along or slightly below the surface of the ground. The whole of the portion of the machine before described is supported in rear by the arms G, and caster-wheels, G', when the front portion is raised above the ground, as shown by the blue lines in fig. 3. The red lines indicate the changes of position made in adjusting the track-clearer. Levers H, pivoted to the main frame at $H^1$, are fastened to the sides A' and suspend the shovel, &c., when in use. By means of these levers the shovel A may be raised above the ground, or the depth of the shovel regulated. These levers are operated by the driver on the seat I, and are held by notches in the catches $H^2$. I' is the foot-board for the driver. K is the main frame to which the mechanism is attached. This frame is carried upon the wheels L, which run upon a movable axle, which they carry with them on their forward revolution, but on which they turn when revolving backwards, so that the working mechanism moved by the spur-wheel M shall only be operated when the machine is moving forward. This is accomplished by devices common in reapers and other machines. The potatoes or other bulbs dug by the shovel are carried over the top of the shovel, and fall upon the endless apron N, which is composed of bars having spaces between them, through which the dirt may fall. Part of these bars, N', are made with wider flanges to sustain the bulbs and prevent their running down the apron. This endless apron is carried upon four pulleys, the upper ones of which are the driving-pulleys, and receive their motion from the pulley O on the end of their shaft. The shield P, extending beyond and over the upper end of the endless apron in connection with it, causes the bulbs to fall upon the grated shaker Q, which inclines towards the rear of the machine. The dirt will fall through the grate, as will also the smaller bulbs, the grating being arranged for this purpose. The larger bulbs will be carried to the end of the grate and fall into the receptacle R, from which they can be discharged as desired by the slide $R^1$, which is actuated by the system of levers, $R^2 R^3 R^4$. The smaller bulbs falling through the upper grate, fall upon the lower and closer grate S, which has a forward inclination. The dirt falls through this grate upon the ground, and the bulbs are carried forward and dropped into the box T, from which they are discharged, as desired, by means of the hinged bottom $T^1$, controlled by the rod $T^2$. Motion is communicated to the mechanism from the spur-wheel M, which is geared into the two pinions $M^1$ and $M^2$. The forward pinion $M^1$ is keyed to a shaft passing across the frame K, and carrying upon its opposite end the double pulley U. The larger pulley U, by means of a belt, communicates motion to the pulley O, and the smaller pulley U', by a like belt, to the pulley O'. The latter pulley drives the cylinder V at a high velocity. The teeth of this cylinder break the clods carried over the shovel A, and seize the weeds, vines, &c., and throw them forward. The adjustable fender V' is placed diagonally across the braces and throws the trash coming from the cylinder to one side. By reversing the position of the fender, the trash may always be thrown out of the way of the machine on its next round. The rearmost pinion $M^2$ is attached to a shaft also passing across the frame, and having upon its opposite end a crank to which is attached the pitman W', communicating a reciprocating motion to the arm X, and lever, $X^1$. The arm X is attached at the middle, upon which it is pivoted, to the lever $X^1$, which sustains the rear of the grated frames Q and S. The front of these frames is sustained by the lever $X^2$ also pivoted at the middle. The lever $X^2$ is longer than the lever $X^1$, so that the front of the upper grate may be raised to give it a descent to the rear, and the front end of the lower grate depressed to give it a descent to the front. The oscillation of the levers $X^1$ and $X^2$ give the grates a short, quick vibratory motion forward and back, thus effecting the more perfect separation of the dirt, and causing the bulbs to travel towards the lowest end.

What I claim as my invention, and seek to secure by Letters Patent, is—

1. In combination with the shovel A, I claim the track-cleaver D, when formed and attached substantially as and for the purpose set forth.

2. I claim the revolving cylinder V, when used in combination with the endless apron M, and shovel A, substantially in the manner and for the purpose set forth.

3. I claim the adjustable shield V', when used in combination with the cylinder V, substantially as and for the purpose set forth.

4. I claim the adjusting levers H, and caster-wheels G', and arms G, when used in combination with the shovel A, substantially as and for the purpose set forth.

5. I claim the combination and arrangement of the crank W, and system of levers W' X $X^1$ and $X^2$, for giving a vibratory motion to the grates Q and S, substantially as set forth.

6. In combination with the vibrating grate Q, I claim the receptacle R and lever $R^1$, the latter being operated substantially in the manner set forth.

7. In combination with the vibratory grate S, I claim the box T, door $T^1$, and rod $T^2$, said parts being arranged substantially as set forth.

In testimony whereof I have signed my name to this specification in the presence of two subscribing witnesses.

JOHN W. BARTLETT.

Witnesses:
  DAVID BARLEN,
  BRIGHAM A. MARSH.